United States Patent
Hashimoto et al.

(10) Patent No.: US 7,779,141 B2
(45) Date of Patent: Aug. 17, 2010

(54) COMMUNICATION APPARATUS OF A HOME SECURITY SYSTEM

(75) Inventors: Kazuhiko Hashimoto, Moriguchi (JP); Kenji Kida, Toyonaka (JP); Tadashi Miki, Osaka (JP); Yasuo Yoshimura, Yamatokoriyama (JP)

(73) Assignee: Panasonic Corporation, Osaka (JP)

( * ) Notice: Subject to any disclaimer, the term of this patent is extended or adjusted under 35 U.S.C. 154(b) by 816 days.

(21) Appl. No.: 10/514,658

(22) PCT Filed: Mar. 13, 2003

(86) PCT No.: PCT/JP03/02989

§ 371 (c)(1),
(2), (4) Date: Oct. 27, 2005

(87) PCT Pub. No.: WO03/098909

PCT Pub. Date: Nov. 27, 2003

(65) Prior Publication Data

US 2006/0155877 A1    Jul. 13, 2006

(30) Foreign Application Priority Data

May 16, 2002  (JP)  ............... 2002-141126
May 16, 2002  (JP)  ............... 2002-141127

(51) Int. Cl.
*G06F 15/16* (2006.01)
*G06F 15/173* (2006.01)

(52) U.S. Cl. .............. 709/232; 709/249; 709/223
(58) Field of Classification Search ........... 709/232, 709/249, 223
See application file for complete search history.

(56) References Cited

U.S. PATENT DOCUMENTS

| | | | | |
|---|---|---|---|---|
| 5,446,445 | A | * | 8/1995 | Bloomfield et al. ......... 340/521 |
| 6,014,089 | A | * | 1/2000 | Tracy et al. ............ 340/870.02 |
| 6,044,403 | A | * | 3/2000 | Gerszberg et al. ........... 709/225 |
| 6,057,764 | A | * | 5/2000 | Williams ................. 340/572.1 |
| 6,215,404 | B1 | | 4/2001 | Morales |
| 6,400,265 | B1 | | 6/2002 | Saylor et al. |
| 6,523,696 | B1 | * | 2/2003 | Saito et al. .................. 709/223 |
| 6,836,737 | B2 | * | 12/2004 | Petite et al. ................... 702/62 |
| 2002/0062365 | A1 | * | 5/2002 | Nishikawa et al. .......... 709/223 |
| 2002/0091812 | A1 | * | 7/2002 | Ando et al. ................. 709/223 |

FOREIGN PATENT DOCUMENTS

| | | |
|---|---|---|
| FR | 2818783 | 12/2000 |
| FR | 2822279 | 3/2001 |
| GB | 2 357 387 | 6/2001 |

(Continued)

*Primary Examiner*—George C Neurauter, Jr.
*Assistant Examiner*—Mark D Fearer
(74) *Attorney, Agent, or Firm*—Wenderoth, Lind & Ponack, L.L.P.

(57) ABSTRACT

The invention provides a communication apparatus used inside a house, a communication system connected thereto, a communication process, and computer program used therefore. The communication apparatus of the present invention connected via a network to one or more terminal appliances in the house, communicates with the outside via two or more different communication configurations including a first communication configuration with a high speed digital transmission technique and a second communication configuration providing service for telephone subscribers. The communication apparatus is characterized in recognizing a situation thereby to disconnect the first communication configuration and to use only the second communication configuration for communication with the outside.

3 Claims, 11 Drawing Sheets

20 Telephone Network
30 Data Communication Network (Internet Network)

FOREIGN PATENT DOCUMENTS

| | | |
|---|---|---|
| JP | 2001-23062 | 1/2001 |
| JP | 2001-359176 | 12/2001 |
| JP | 2003-78651 | 3/2003 |
| WO | 01/11586 | 2/2001 |
| WO | 01/99399 | 12/2001 |
| WO | 02/37443 | 5/2002 |

\* cited by examiner

COMMUNICATION APPARATUS OF A HOME SECURITY SYSTEM

BACKGROUND OF THE INVENTION

1) Technical Field of the Invention

The present invention relates to a data communication apparatus in a data communication system, a data communication process, and a computer program, which are used for safely controlling and maintaining the household and security appliances in a house via networks.

2) Description of Related Arts

Infrastructures of communication network systems have remarkably been developed in these days. Several techniques are already available for remote control and monitor of electrical household and security appliances, e.g., the status and operation thereof, with use of the communication apparatus secured in the house and the external device such as a mobile phone. The electrical household appliances include a washing machine, an air-conditioner, a refrigerator, and a boiler, and security appliances include an open/close sensor and an obstacle detecting sensor equipped with a door and/or a window.

While the advantage of remote control and monitor in the network system can be fully enjoyed, there are increased risk of improper and/or illegal access to the household and security appliances, thereby allowing the unauthorized third party to control thereof irrespective of the users' intention. In particular, the abuse of the household appliances generating a substantial amount of heat and water could cause a devastating problem. Also, the security appliances includes, in general, operation modes having a stay-in and go-out modes for selecting a security level, and a cancellation mode for canceling any operation modes of the security appliances. If the security appliance is illegally accessed from the outside so as to intentionally cancel all operation modes, then such security appliances would be useless.

However, if the access to the appliances from the outside of the house is totally prohibited, the advantage for use of the communication apparatus in the network system allowing the remote control and monitor of the household and security appliances would substantially be sacrificed. Therefore, the advantage of the communication apparatus has to compromise with the security risk by the illegal access.

Meanwhile, one of the conventional communication configurations having a specific charge system, e.g., charging 10 yen per minute, includes an analog telephone network providing communication service for telephone subscribers. In this communication configuration, the user has to make a call so as to communicate with the communication apparatus. Thus, since the connection of the communication configuration is made only when necessary, the high level of the security is maintained although the communication speed is low. The Internet protocol telephone that has recently been developed may also be categorized within this type of the communication configurations. On the other hand, another type of communication configurations having a non-specific charge system, e.g., charging 2000 yen per month irrespective of connection time, includes a non-specific high speed digital network such as the ADSL (Asymmetric Digital Subscriber Line) Internet network, which has a great communication speed. However, a continuous communication of this type of networks could expose the appliances to the risk of illegal access from the outside. As highly expected in near future, the household appliances will be accessed from the outside via the high speed digital communication network such as the ADSL network for remote control thereof. Therefore, the security against the illegal access should be warranted.

Thus, taking into consideration of the aforementioned drawbacks, the present invention has a purpose to provide a communication apparatus preventing an improper access to the appliances and allowing one or more particular persons to access the appliances under a particular condition.

Also, the present invention has a purpose to provide the communication apparatus preventing the improper access by informing when the access is available. The present invention may be adapted to various network systems.

It should be noted that the "high speed" digital communication network has the transmission speed greater than several hundred kilo bps including a fiber optical and cable networks.

SUMMARY OF THE INVENTION

The invention provides a communication apparatus used inside a house, a communication system connected thereto, a communication process, and computer program used therefor.

The communication apparatus of the present invention connected via a network to one or more terminal appliances in the house, communicates with an outside via two or more different communication configurations including a first communication configuration with a high speed digital transmission technique and a second communication configuration providing service for telephone subscribers. The communication apparatus is characterized in recognizing a situation thereby to disconnect the first communication configuration and to use only the second communication configuration for communication with the outside.

Further, the communication apparatus recognizes a situation thereby to disconnect the first communication configuration, and to allow the disconnected first communication configuration to be available for communication with the outside only if data transmitted from an external communication device via the second communication configuration is verified.

The communication process of the present invention is used for a communication system including a communication apparatus collecting data via a network from one or more terminal appliances in a house and a central server apparatus capable of communicating data with the communication apparatus, the communication apparatus communicating with the central server apparatus via two or more different communication configurations including a first communication configuration with a high speed digital transmission technique and a second communication configuration providing service for telephone subscribers. The communication process is characterized in recognizing a situation thereby to disconnect the first communication configuration and to use only the second communication configuration for communication with the outside.

The communication process may include informing the central server apparatus when the disconnected first communication configuration becomes available.

The communication apparatus of the present invention determines whether a person stays in the house thereby to disrupt or limit the access via at least one of the first and second communication configurations in accordance with content of its decision.

In the above communication apparatus, the settings indicating whether the person stays or not may be switched by the communication apparatus in the house but not from the outside.

In the above communication apparatus, the communication apparatus may require approval by another registered communication device to change the limit of the scope for the access.

The communication process of the present invention is used for a communication apparatus connected via a network to one or more terminal appliances in a house, and capable of communicating with an outside via two or more different communication configurations including a first communication configuration with a high speed digital transmission technique and a second communication configuration providing service for telephone subscribers. The communication apparatus determines whether the person stays in the house thereby to limit a scope of the access via either one of the first and second communication configurations in accordance with a situation whether the person stays or not. The communication process includes referring the situation whether the person stays or not, and determining whether to admit or reject the access from the outside in accordance with the situation.

DETAILED DESCRIPTION OF THE PREFERRED EMBODIMENTS

With reference to drawings, preferred embodiments will be described herein in detail.

Embodiment 1

Figure 1:
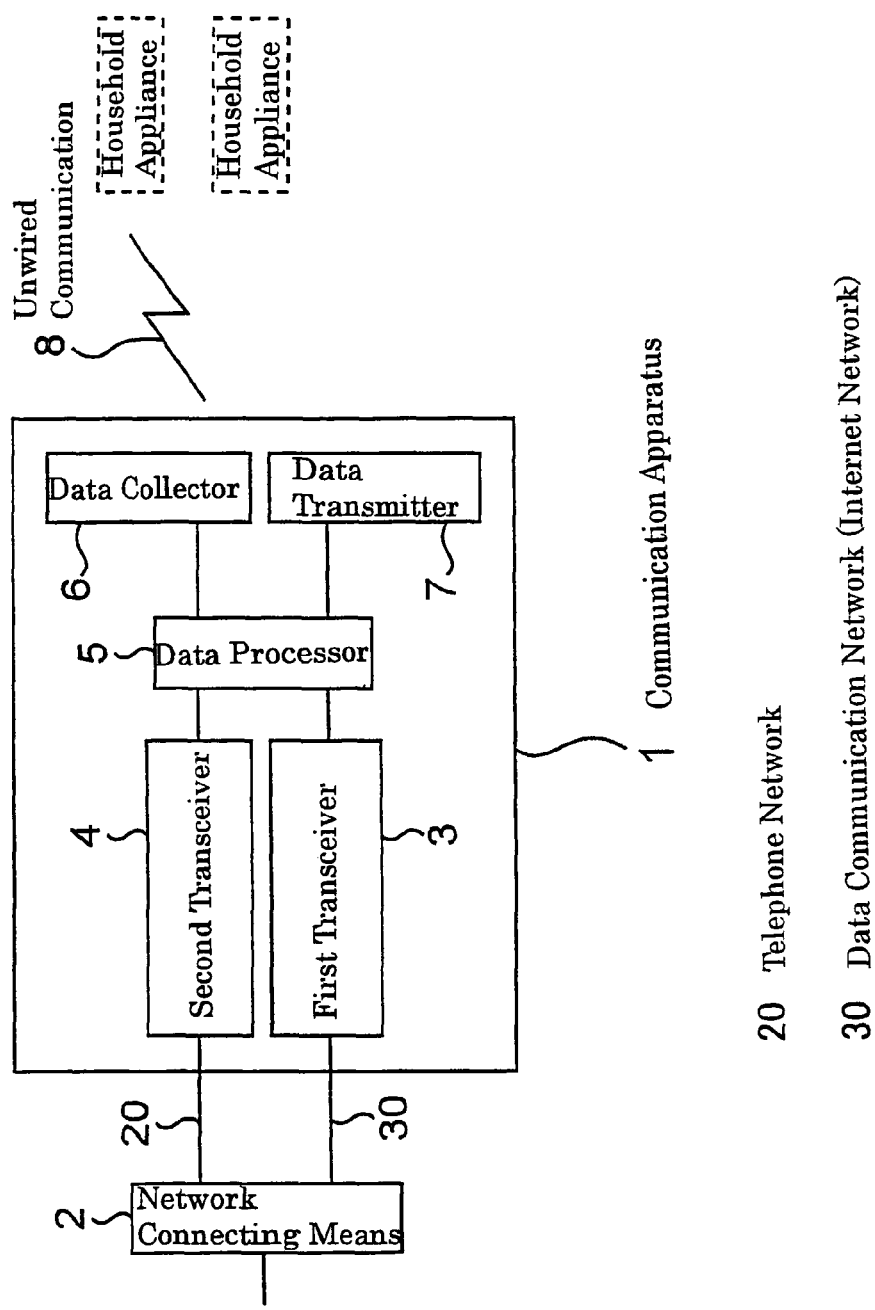
FIG. 1 is a functional block diagram of a communication apparatus according to the first embodiment of the present invention.

FIG. 1 is a functional block diagram of a communication apparatus according to the first embodiment of the present invention. The structure of the embodiment will be described herein.

As shown in FIG. 1, the communication apparatus 1 includes a first transceiver 3, a second transceiver 4, a data processor 5, a data collector 6, and a data transmitter 7. The communication apparatus 1 is connected to electrical household appliances via unwired transmission 8 so that the data collector 6 collects data from the household appliances and the data transmitter 7 transmits data to the household appliances. The collected and/or transmitted data can be processed by the data processor 5, and communicated with the outside via a network connecting means 2 and either one of the first and second transceivers 3, 4. The networks communicating the first and second transceivers 3, 4 with the network connecting means 2 include a telephone network 20 providing a communication service for telephone subscribers, and an Internet network 30 that is the data communicating network with a fast digital communication technique, respectively. For instance, when the communication apparatus 1 and a security appliance connected thereto detect an intruder in a house, firstly, the communication apparatus 1 uses the telephone network 20 for securing an immediate alarm to the outside. Then, the communication apparatus 1 uses the Internet network 30 for transmitting a substantial amount of data including image data and sound data collected on the scene to an appropriate authority.

The communication apparatus 1 is designed such that the data processor 5 thereof processes the data collected from each of the household and security appliances and recognizes the situation in the house at the moment thereby to disconnect the Internet network 30 and to use only the telephone network 20 for communication with the outside.

According to the first embodiment of the present invention, the communication apparatus 1 connected to the terminal appliances in the house is constructed as described above such that it can communicate with the outside through two or more different communication configurations including the telephone network 20 and the Internet network 30 as the data communication network. Thus, the communication apparatus 1 can disconnect the Internet network 30 as the data communication network and use only the telephone network 20 for communication with the outside in accordance with the recognition of the situation.

To this result, only particular persons can access the communication apparatus under particular conditions while preventing the improper access thereto so that the reliability of the apparatus can be enhanced.

Embodiment 2

Figure 2:
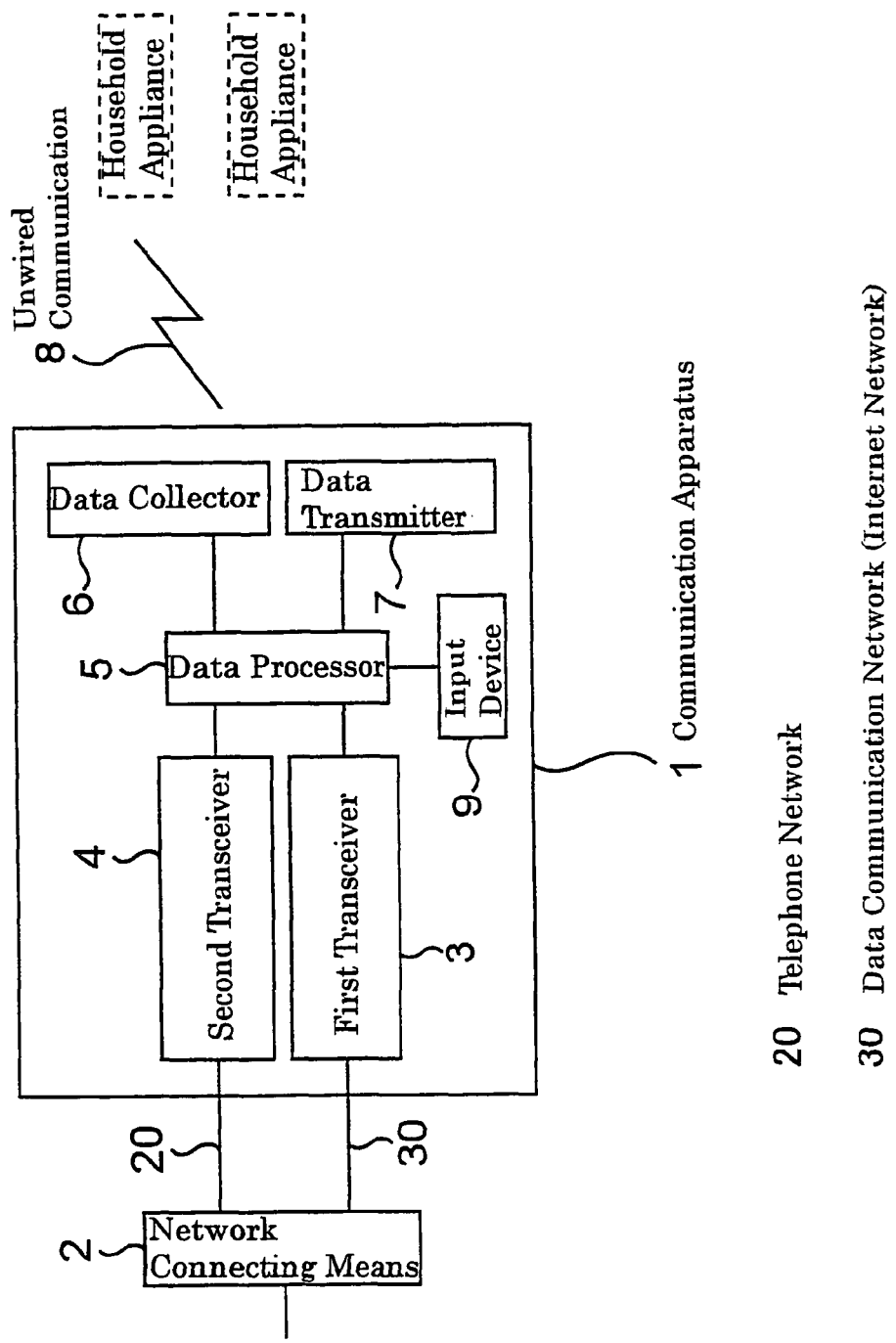
FIG. 2 is a functional block diagram of the communication apparatus according to the second to fifth embodiments of the present invention.

FIG. 2 is a functional block diagram of a communication apparatus according to the second embodiment of the present invention. The structure of the embodiment will be described herein.

As shown in FIG. 2, the communication apparatus 1 includes a first transceiver 3, a second transceiver 4, a data processor 5, a data collector 6, a data transmitter 7, and an input device 9. The communication apparatus 1 is connected with electrical household appliances via unwired transmission 8 so that the data collector 6 collects data from the household appliances and the data transmitter 7 transmits data to the household appliances. The collected and/or transmitted data can be processed by the data processor 5, and communicated with the outside via a network connecting means 2 and either one of the first and second transceivers 3, 4. The communication networks used for the apparatus include a telephone network 20 and an Internet network 30 as the data communication network.

The communication apparatus 1 is designed such that the data processor 5 thereof processes the data collected from each of the household and security appliances and recognizes the situation in the house at the moment thereby to disconnect the Internet network 30 and to use only the telephone network 20 for communication with the outside.

For instance, a resident in the house may push an absent button on the input device 9 before leaving the house so that the communication device 1 recognizes the absence of the resident and disconnects the Internet network 30 as the data communication network.

Also, when the resident comes back to the house, he or she may push a present button on the input device 9 so that the communication device 1 recognizes the presence of the resident and allows the Internet network 30 as the data communication network to become available for communication.

The resident can be sensed in alternative ways rather than the above-mentioned buttons allowing the communication device 1 to recognize the presence or absence of any persons in the house. For example, the person can be detected by sensing with an obstacle detecting sensor and/or by sensing the ON/OFF switching of a luminary appliance. When the person is determined to be present in the house, the access via the Internet network 30 as the data communication network from the outside can be prohibited. In addition, it is possible for the communication apparatus 1 to sense the person by monitoring the usage amount of lifeline, for example, by gas, electric power, and water meters.

To this result, only particular persons can access the communication apparatus under particular conditions while preventing the improper access, thereto so that the reliability of the apparatus can be enhanced. Further, since the Internet network 30 as the data communication network is available to communicate with the communication apparatus 1 only when required, data security can be even enhanced.

Embodiment 3

The communication apparatus 1 according to the third embodiment will be described herein. The communication apparatus 1 of the embodiment has the structure similar to one as illustrated in FIG. 2.

In the third embodiment, the communication apparatus 1 is designed such that the data processor 5 thereof processes the data from each of the appliances and determines the time thereby to disconnect the Internet network 30 and to use only the telephone network 20 for communication with the outside.

The communication apparatus 1 can determine the night time with use of a timer or an electronic watch thereby to disconnect the Internet network 30 as the data communication network.

Also, the communication apparatus 1 can determine the day time thereby to allow the Internet network 30 as the data communication network to become available for communication with the outside.

Furthermore, besides the timer, the communication apparatus 1 can refer, for example, to a calendar stored therein thereby to disconnect the Internet network 30 on particular weekends and holidays. Thus, the access via the Internet network 30 as the data communication network is disrupted during the sleeping time and/or the present days when it is quite unlikely to make an access from the outside to the communication apparatus 1 in the house.

Embodiment 4

The communication apparatus 1 according to the fourth embodiment will be described herein. The communication apparatus 1 of the embodiment also has the structure similar to one as illustrated in FIG. 2.

In the fourth embodiment, the communication apparatus 1 is designed such that the data processor 5 thereof processes the data from each of the appliances and determines the display status at the moment thereby to disconnect the Internet network 30 and to use only the telephone network 20 for communication with the outside.

For example, when the communication apparatus 1 is not used and the display thereof is switched off, then the communication apparatus 1 may disconnect the Internet network 30 as the data communication network.

On the other hand, when the display of the communication apparatus 1 is switched on, the communication apparatus 1 may use the Internet network 30 as the data communication network for communication with the outside.

Also, when the display status of the communication apparatus 1 is inactive, e.g., showing a screen-saver, a current-time, or a set-up display of the appliances, the communication apparatus 1 may disconnect the Internet network 30 as the data communication network.

In addition to the display status, while the communication apparatus 1 also serves a function as an answering machine, the standby setting of the answering function can be used for determining whether to disconnect the Internet network 30. For example, when the answering function is set to be standby, the Internet network 30 as the data communication network may be disconnected.

Embodiment 5

The communication apparatus 1 according to the fifth embodiment will be described herein. The communication apparatus 1 of the embodiment also has the structure similar to one as illustrated in FIG. 2.

In the fifth embodiment, the communication apparatus 1 is designed such that the data processor 5 thereof processes the data from each of the appliances and recognizes the status and/or the operation of the household and security appliances at the moment thereby to disconnect the Internet network 30 and to use only the telephone network 20 for communication with the outside.

For instance, when the household and security appliances are in the OFF status or operation, the communication apparatus 1 may disconnect the Internet network 30 as the data communication network.

Also, when the household and security appliances are in the ON status or operation, the communication apparatus 1 may allow the Internet network 30 as the data communication network to be available for communication with the outside.

Embodiment 6

Figure 3:
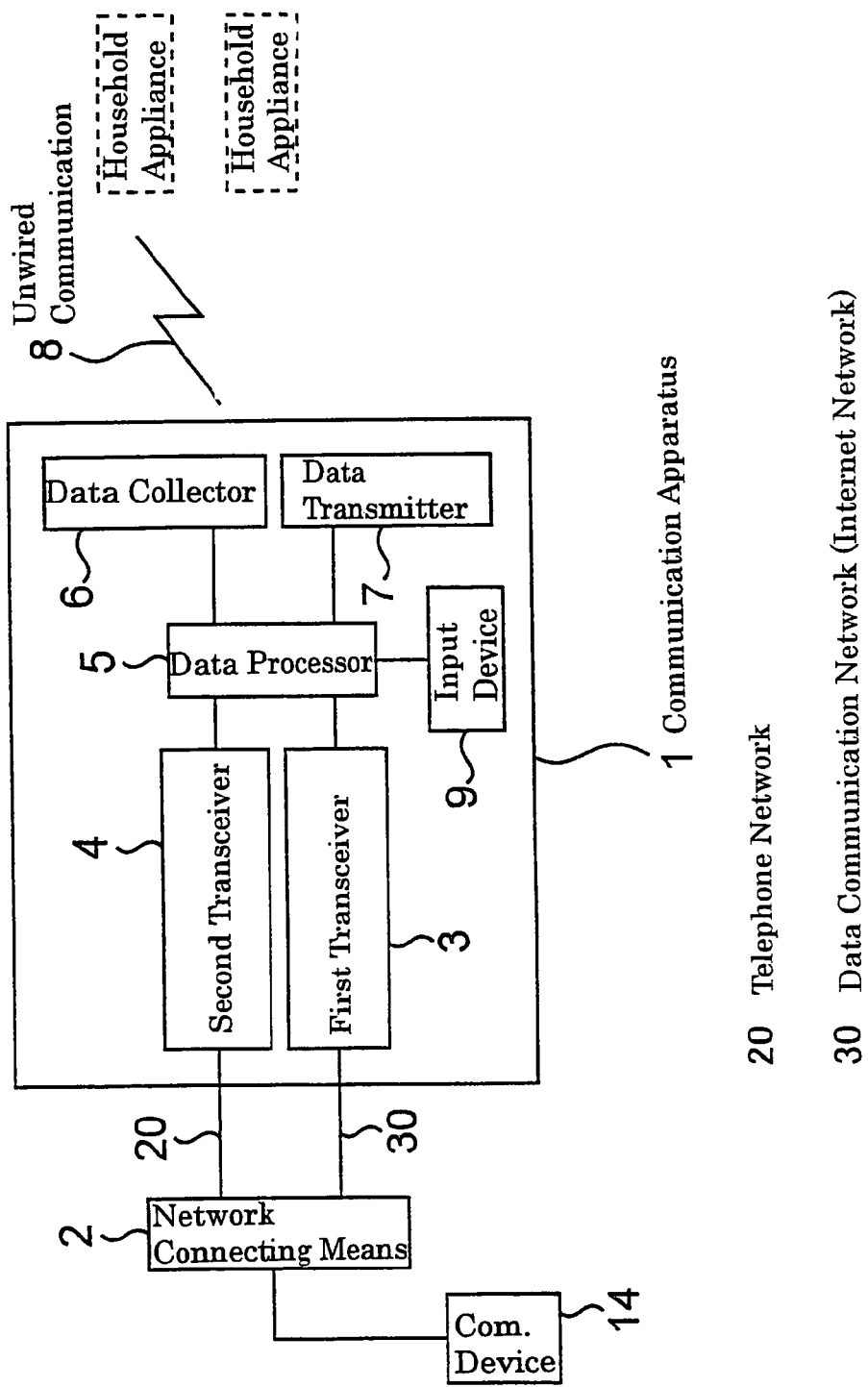
FIG. 3 is a functional block diagram of the communication apparatus according to the sixth embodiment of the present invention.

FIG. 3 is a functional block diagram of a communication apparatus according to the sixth embodiment of the present invention. The structure of the embodiment will be described herein.

As shown in FIG. 3, the communication apparatus 1 includes a first transceiver 3, a second transceiver 4, a data processor 5, a data collector 6, a data transmitter 7, and an input device 9. The communication apparatus 1 is connected with each of the appliances via unwired transmission 8 so that the data collector 6 collects data from each of the appliances and the data transmitter 7 transmits data to each of the appliances. The collected and/or transmitted data can be processed by the data processor 5, and communicated with an external communication device 14 via a network connecting means 2 and either one of the first and second transceivers 3, 4. The networks communicating the first and second transceivers 3, 4 with the network connecting means 2 include a telephone network 20 and an Internet network 30 as the data communicating network, respectively.

The communication apparatus 1 is designed such that the data processor 5 thereof processes the data collected from each of the household and security appliances and recognizes the situation in the house at the moment thereby to disconnect the Internet network 30 and to use only the telephone network 20 for communication with the outside. Afterwards, upon receiving data transmitted from a particular communication device 14 such as an external telephone, the communication apparatus 1 may allows the Internet network 30 as the data communicating network to be available for communication with the outside.

Thus, the communication apparatus 1 is designed such that only if it verifies the data transmitted from the communication device 14 having a registered telephone number or a password, it may allow the Internet network 30 as the data communicating network to be available for communication.

According to the embodiment of the present invention, the communication apparatus 1 connected to the terminal appliances in the house is constructed as described above such that it can communicate with the outside through two or more different communication configurations including the telephone network 20 and the Internet network 30 as the data communication network. Also, the communication apparatus 1 may be designed so as to allow the Internet network 30 being available only when it determines and verifies that the data transmitted from the outside via the telephone network 20 is consisting with the pre-stored identification data.

To this result, only particular persons can access the communication apparatus under particular conditions while preventing the improper access from the outside so that the reliability of the apparatus can be enhanced. Further, since the Internet network 30 as the data communication network is available to communicate with the communication apparatus 1 only when so required, a stability of data security and an advantage of the Internet network 30 as the data communication network can be achieved.

Embodiment 7

Figure 4:
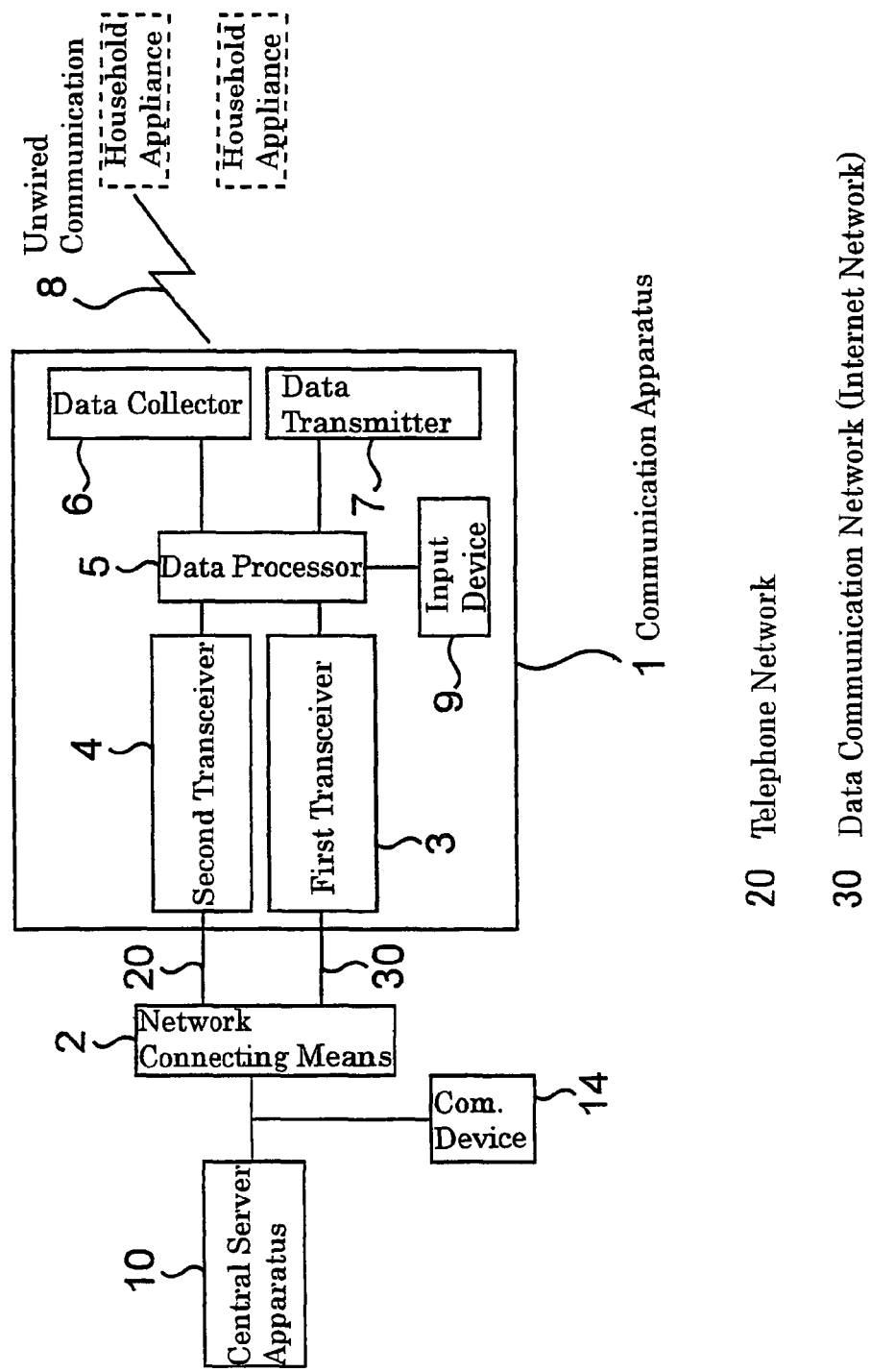
FIG. 4 is a functional block diagram of the communication apparatus according to the seventh to tenth embodiments of the present invention.

FIG. 4 is a functional block diagram of a communication apparatus according to the seventh embodiment of the present invention. The structure of the embodiment will be described herein.

As shown in FIG. 4, the communication apparatus 1 includes a first transceiver 3, a second transceiver 4, a data processor 5, a data collector 6, a data transmitter 7, and an input device 9. The communication apparatus 1 is connected with each of the appliances via unwired transmission 8 so that the data collector 6 collects data from each of the appliances and the data transmitter 7 transmits data to each of the appliances. The collected and/or transmitted data can be processed by the data processor 5, and communicated with a central server apparatus 10 and an external communication device 14 via a network connecting means 2 and either one of the first and second transceivers 3, 4. The networks communicating the first and second transceivers 3, 4 with the network connecting means 2 include a telephone network 20 and an Internet network 30 as the data communicating network, respectively.

The communication apparatus 1 is designed such that the data processor 5 thereof processes the data collected from each of the household and security appliances and recognizes the situation in the house at the moment thereby to disconnect the Internet network 30 and to use only the telephone network 20 for communication with the outside. Afterwards, upon receiving data transmitted from a particular communication device 14 such as an external telephone, the communication apparatus 1 may allows the Internet network 30 as the data communicating network to be available for communication with the outside. In addition to that, the communication apparatus 1 may provide the central server apparatus 10 and the communication device 14 such as a telephone with a message indicating that the communication via the Internet network 30 becomes available. Then, the central server apparatus 10 learns that the communication via the Internet network 30 is available, and data stored in the central server apparatus 10 may be transmitted to the communication apparatus 1 through the high speed Internet network 30.

According to the embodiment of the present invention, the communication apparatus 1 connected to the terminal appliances in the house is constructed as described above such that it can communicate with the outside through two or more different communication configurations including the telephone network 20 and the Internet network 30 as the data communication network. Also, the communication apparatus 1 may inform the central server apparatus 10 of the message that the disconnected Internet network is available.

Further, upon receiving the message that the communication via the Internet network 30 is available, the central server apparatus 10 may monitor the resident's present/absent status in the house. Therefore, the abnormal situation including a long-term absence of the resident can be found in an earlier stage.

To this result, only particular persons can access the communication apparatus under particular conditions while preventing the improper access from the outside so that the reliability of the apparatus can be enhanced. Further, since the communication apparatus 1 informs of the message that the Internet network 30 as the data communication network is available, a stability of data security and an advantage of the Internet network 30 as the data communication network can be achieved.

Embodiment 8

The communication apparatus 1 according to the eighth embodiment will be described herein. The communication apparatus 1 of the embodiment also has the structure similar to one as illustrated in FIG. 4.

In the eighth embodiment, the communication apparatus 1 is designed such that the data processor 5 thereof processes the data from each of the household and security appliances and recognizes the situation in the house the moment thereby to disconnect the Internet network 30 and to use only the telephone network 20 for communication with the outside. Also, upon receiving data transmitted from the communication device 14 such as a telephone, the communication apparatus 1 may re-connect the Internet network 30 as the data communication network for further communication. Further, the communication apparatus 1 may transmit a global address obtained for itself to the central server apparatus 10 and as well as to the communication device 14.

According to the embodiment of the present invention, the communication apparatus 1 connected to the terminal appliances in the house is constructed as described above such that it can communicate with the outside through two or more different communication configurations including the telephone network 20 and the Internet network 30 as the data communication network. When the disconnected Internet network 30 as the data communication network becomes available, the central server apparatus 10 is informed of the obtained global address from the communication apparatus 1 for facilitating the access thereto from the central server apparatus 10.

Embodiment 9

The communication apparatus 1 according to the ninth embodiment will be described herein. The communication apparatus 1 of the embodiment also has the structure similar to one as illustrated in FIG. 4.

In the, ninth embodiment, the communication apparatus 1 is designed such that the data processor 5 thereof processes the data from each of the household and security appliances and recognizes the situation in the house at the moment thereby to disconnect the Internet network 30 and to use only the telephone network 20 for communication with the outside. Also, upon receiving data transmitted from the communication device 14 such as a telephone, the communication apparatus 1 may allows the Internet network 30 as the data communication network to be available for communication. Further, the communication apparatus 1 may transmit status/operation data of the household and security appliances to the central server apparatus 10 and the communication device 14 such as a telephone.

In this context, the status/operation data include a power ON/OFF status of the household and security appliances, a preset temperature of an air conditioner, a preset operation mode and time of a washing machine, data from each of the household appliances, and usage amount of lifeline, for example, by gas, electric power, and water meters.

Embodiment 10

The communication apparatus 1 according to the tenth embodiment will be described herein. The communication apparatus 1 of the embodiment also has the structure similar to one as illustrated in FIG. 4.

In the tenth embodiment, the communication apparatus 1 is designed such that the data processor 5 thereof processes the data from each of the household and security appliances and determines the resident as being absent in the house thereby to disconnect the Internet network 30 and to use only the telephone network 20 for communication with the outside. Also, upon receiving data transmitted from the communication device 14 such as a telephone, the communication apparatus, 1 may allow the Internet network 30 as the data communication network to be available for communication. Further, the communication apparatus 1 may transmit data indicating that Internet network becomes available to the central server apparatus 10 and as well as to communication devices having predetermined telephone numbers and mail addresses. Such predetermined telephone numbers and mail addresses have been stored in a particular memory region of the communication apparatus 1.

According to the embodiment of the present invention, the communication apparatus 1 connected to the terminal appliances in the house is constructed as, described above such that it can communicate with the outside through two or more different communication configurations including the telephone network 20 and the Internet network 30 as the data communication network. While the resident is absent in the house, and then the disconnected Internet network 30 as the data communication network becomes available, the predetermined telephone numbers and mail addresses are informed that the Internet network 30 is available for communication.

To this result, only particular persons can access the communication apparatus under particular conditions while preventing the improper access from the outside so that the reliability of the apparatus can be enhanced. Also, since the Internet network 30 as the data communication network is available to communicate with the communication apparatus 1 only when so required, data security can be even enhanced.

It should be noted that besides the telephone, any type of means can be used to inform the users and administrators that the Internet network 30 is available. Preferably, the communication apparatus 1 may require ratification from the users and/or administrators after it sends the message of the availability of the Internet network. Thus, the communication apparatus 1 may be designed such that it keeps the Internet network 30 disconnected unless and until it receives the ratification the users and/or administrators. Without ratification, the communication apparatus 1 may realize that an unauthorized access (intruder) is detected thereby to operate a crime-prevention security system.

Embodiment 11

Figure 5:
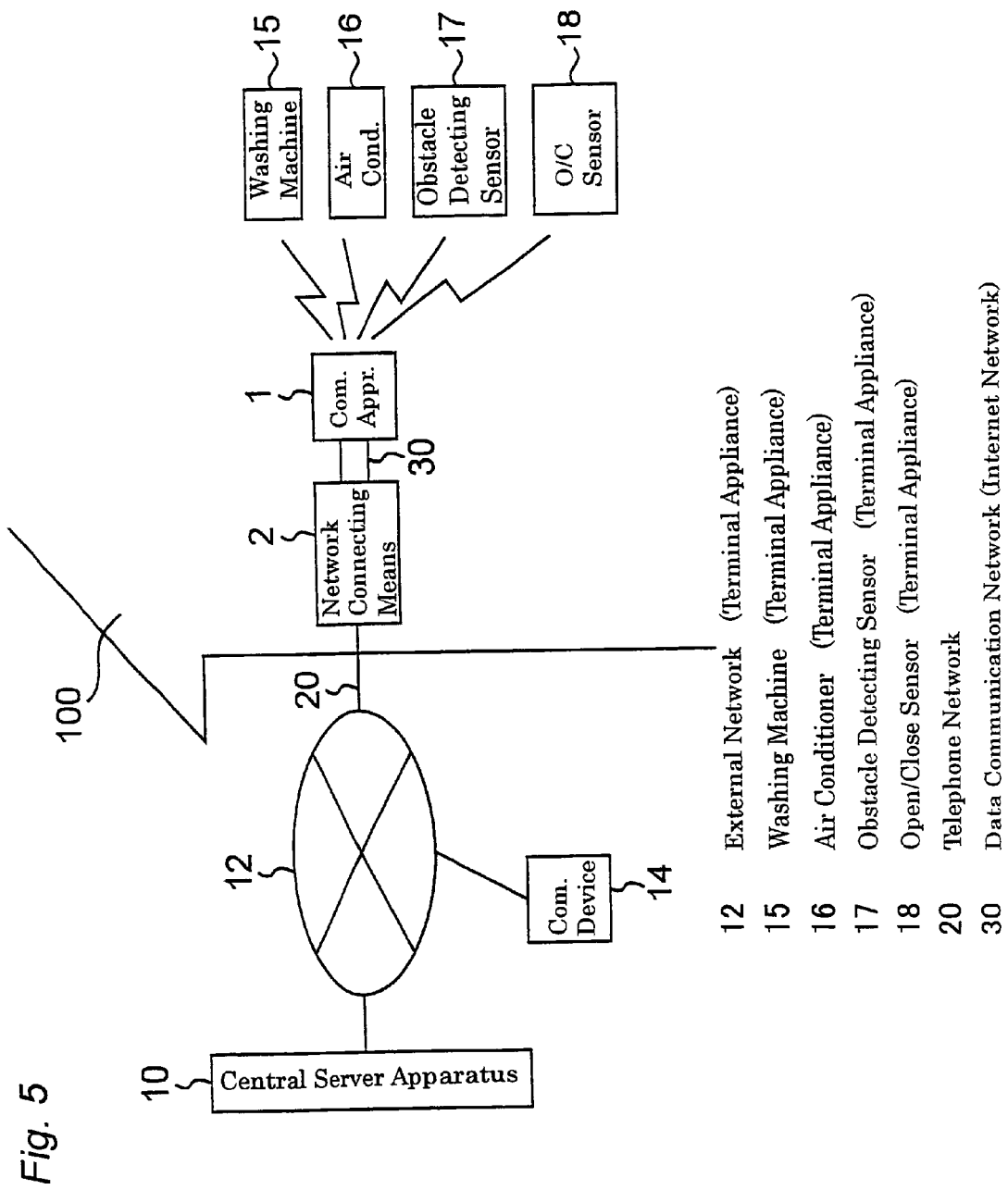
FIG. 5 is a schematic view illustrating a whole system according to the eleventh embodiment of the present invention.

FIG. 5 is a schematic view illustrating a whole system according to the eleventh embodiment of the present invention. The structure of the embodiment will be described herein.

The system shown in FIG. 5 includes a communication apparatus 1 having household appliances such as a washing machine 15 and an air conditioner 16, and security appliances such as an obstacle detecting sensor 17 and an open/close sensor 18, both of which appliances are provided in the house 100. The system also includes a network connecting means 2 for connecting the communication apparatus 1 to the outside, i.e., an external network 12 outside the house, an external communication device 14 such as a telephone, and a central server apparatus 10.

The communication apparatus 1 is connected via unwired communication with each of the household appliances so that it retrieves data from and transmits data to each of the appliances. The retrieved data from the appliances and the input data from the input device may be processed by the communication apparatus 1, and transmitted to the external central server apparatus 10 and the communication device 14 via the network connecting means 2 and the external network 12.

In particular, a dialup connection (PPP connection) between the communication apparatus 1 and an Internet Service Provider (ISP) is made via an analog telephone network with use of the network connecting means 2 such as a modem and a splitter, and a TCP/IP connection is made to the central server apparatus 10 via the external network (WEB) so that the communication apparatus 1 establishes the communication with the central server apparatus 10. Alternatively, the communication apparatus 1 may use another ADSL network of the broad band network to connect directly to the central server apparatus 10 via the network connecting means 12. The connecting network may be a fiber optical network such as FTTH for data communication.

In the communication apparatus 1 connected to the outside via a plurality of communication configurations, it recognizes the situation in the house and determines which communication network is to be used. For instance, the communication apparatus 1 recognizes the resident leaving the house with the absent button pushed on before going out, thereby to disconnect the ADSL network and uses only the telephone network 20 for communication with the outside.

Also, when the resident comes back, the communication apparatus 1 recognizes the resident coming back with the present button pushed on after coming in, and then allows the ADSL network to be available.

Further, when the resident communicates with the communication apparatus 1 via the telephone network 20 from the external telephone, the communication apparatus 1 verifies whether the telephone number of the resident is the authorized number stored in advance therein. If the number is verified, then the communication apparatus 1 allows the ADSL network to be available for communication.

To this result, only particular persons can access the communication apparatus under particular conditions while preventing the improper access thereto so that the highly reliable system can be realized. Also, since the broad band ADSL network is available for communication only when so required, a stability of data security and an advantage of the broad band ADSL network can be achieved.

Embodiment 12

Figure 6:
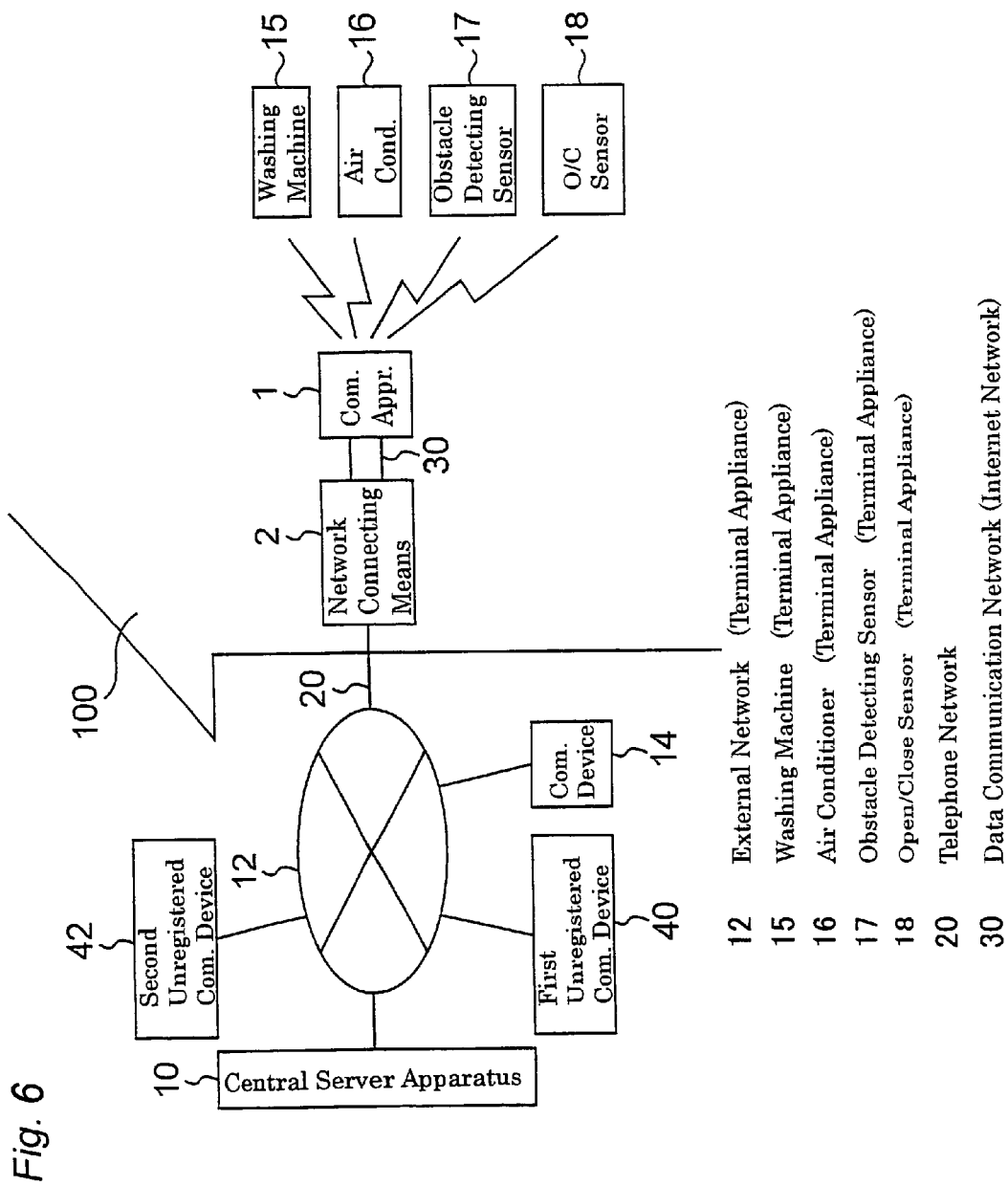
FIG. 6 is a schematic view illustrating the whole system according to the twelfth embodiment of the present invention.

FIG. 6 is a schematic view illustrating a whole system according to the twelfth embodiment of the present invention. The structure of the embodiment will be described herein.

The system shown in FIG. 6 includes a communication apparatus 1 having household appliances such as a washing machine 15 and an air conditioner 16, and security appliances such as an obstacle detecting sensor 17 and an open/close sensor 18, both of which appliances are provided in the house 100. The system also includes a network connecting means 2 for connecting the communication apparatus 1 to the outside, i.e., an external network 12 outside the house, an external communication device 14 such as a telephone, and a central server apparatus 10. The communication networks include a telephone network 20 and the Internet network 30 as the data communication network.

The communication apparatus 1 is connected via unwired communication with each of the household appliances so that it retrieves data from and transmits data to each of the appliances. The retrieved data from the appliances and the input data from the input device may be processed by the communication apparatus 1, and transmitted to the external central server apparatus 10 and the communication device 14 via the network connecting means 2 and the external network 12.

In particular, a dialup connection (PPP connection) between the communication apparatus 1 and an Internet Service Provider (ISP) is made via an analog telephone network with use of the network connecting means 2 such as a modem and a splitter, and a TCP/IP connection is made to the central server apparatus 10 via the external network (WEB) so that the communication apparatus 1 establishes the communication with the central server apparatus 10. Alternatively, the communication apparatus 1 may use another ADSL network of the broad band network to connect directly to the central server apparatus 10 via the network connecting means. 12. Further, the connecting network may be a fiber optical network such as FTTH for data communication.

The transceiver of the communication apparatus 1 has a memory therein storing data of the URL required for connection and data required for the dialup connection such as the telephone number. Alternatively, the communication apparatus 1 can retrieve the aforementioned data from another memory in a predetermined memory region. Also, for data communication, the communication apparatus 1 retrieves terminal identifications and/or passwords stored in a predetermined memory region so that it can properly obtain those passwords and process in a login step, accordingly.

In the communication apparatus 1 connected to the outside via a plurality of communication configurations, it recognizes the situation in the house and determines which communication network is to be used. For instance, the communication apparatus 1 recognizes the resident leaving the house with the absent button pushed on before going out, and then disconnects the ADSL network and uses only the telephone network 20 for communication with the outside.

Also, when the resident communicates with the communication apparatus 1 via the telephone network 20 from the external telephone, the communication apparatus 1 verifies whether the telephone number of the resident is the authorized number stored therein. If the number is verified, the communication apparatus 1 may allow the ADSL network to be available for communication. Then, the communication apparatus 1 transmits a message to the central server apparatus 10 that the ADSL network becomes available for communication.

On the other hand, even if a person makes a call from an unregistered communication device (a first unregistered communication device 40) such as an unknown telephone, no verification of the communication device will be made. Therefore, the broad band ADSL network cannot be available for communication with the device.

When the ADSL network becomes available, the central server apparatus 10 assigns a global address to the communication apparatus 1, which in turn is informed to a communication device 14 having a predetermined telephone number and an e-mail addressee having a predetermined e-mail address of the assigned global address. Those predetermined telephone number and e-mail address are, stored in a predetermined memory region of the communication apparatus 1.

Also, when the ADSL network becomes available, data indicating the operation and status of the household and security appliances in the house are transmitted to the central server apparatus 10 so that the communication device such as a mobile phone can be used to monitor a malfunction and/or other operation of the household and security appliances.

To this result, only particular persons can access the communication apparatus under, particular conditions while preventing the improper access thereto so that the highly reliable system can be structured. Also, since the broad band ADSL network is available for communication only when so required, a stability of data security and an advantage of the broad band ADSL network can be achieved. Further, after the availability of the broad band ADSL network is established, the communication apparatus 1 informs the central server apparatus 10 and the predetermined telephone and/or e-mail addressee of the ADSL's availability, therefore, the security can be even further enhanced.

Embodiment 13

Figure 7:
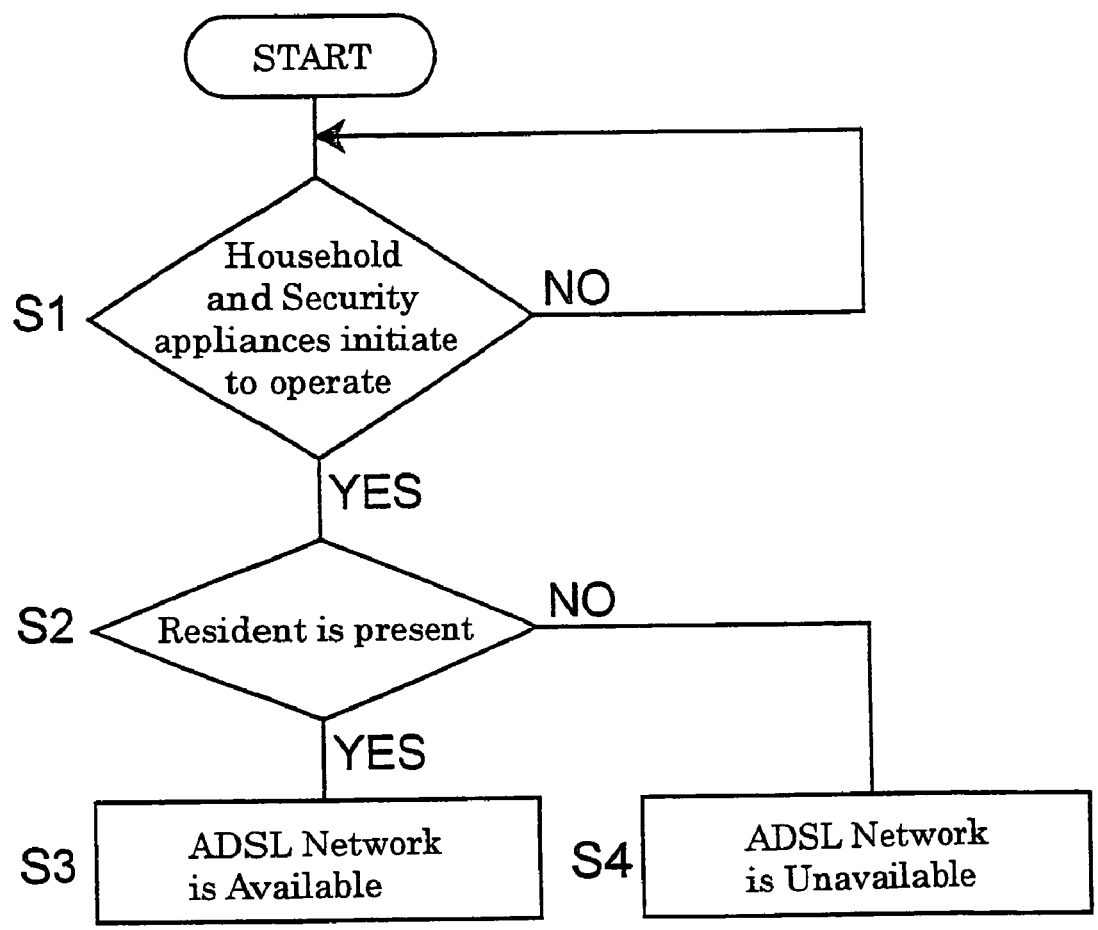
FIG. 7 is a flow chart illustrating a process according to the thirteenth embodiment of the present invention.

FIG. 7 is a flow chart illustrating a process of a communication apparatus according to the thirteenth embodiment of the present invention. The flow chart of the embodiment will be described herein.

In Step S1, the communication apparatus 1 determines whether the household appliances such as an air conditioner and/or the security appliances such as an obstacle detecting sensor and an open/close sensor are initiated to operate. If initiated, then in Step S2, it is determined whether the resident stays in the house. If he or she stays in, then in Step S3, the communication apparatus 1 allows the broad band ADSL network to keep available. If it is determined that the resident is absent, then in Step S4, the communication apparatus 1 disconnects the broad band ADSL network.

Besides the resident's presence or absence, any other conditions for switching the ADSL network to be unavailable may be adapted including, for example, the time, the display status and/or the power ON/OFF of the communication apparatus, and the operations of the household and security appliances.

Embodiment 14

Figure 8:
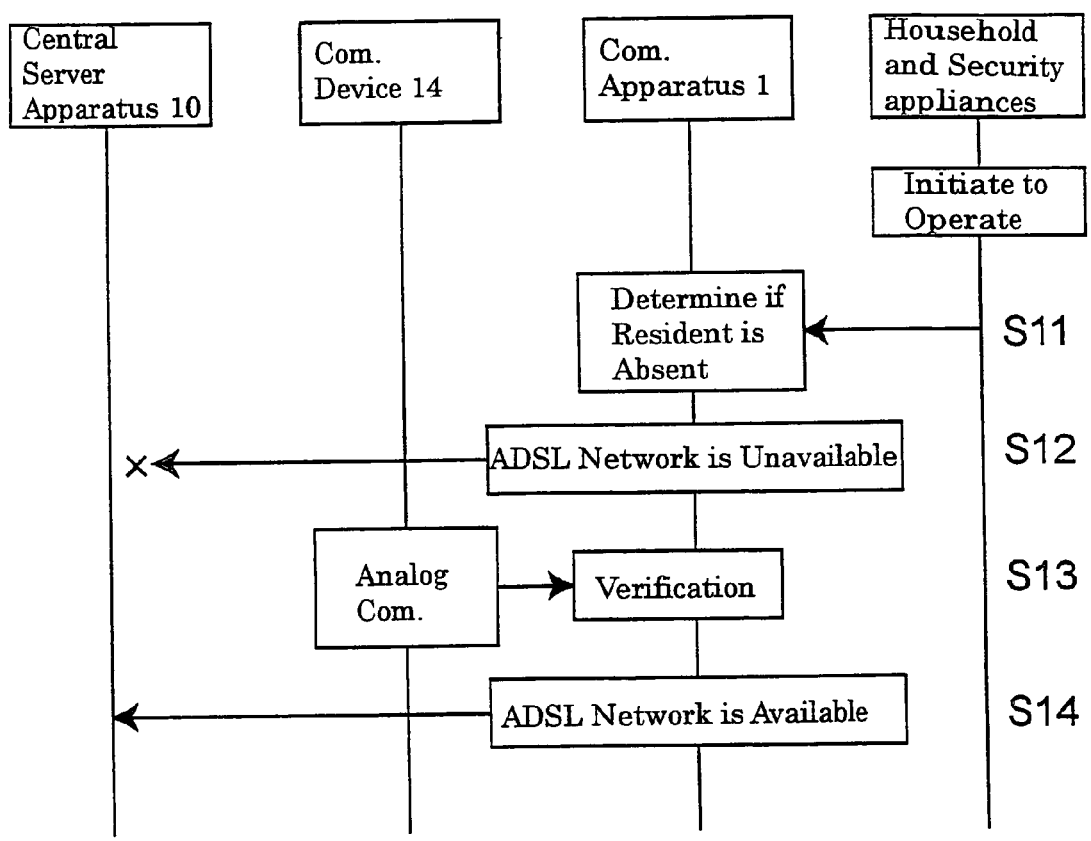
FIG. 8 is a flow chart illustrating a process according to the fourteenth embodiment of the present invention.

FIG. 8 is a flow chart illustrating a process of a communication apparatus according to the fourteenth embodiment of the present invention. The flow chart of the embodiment will be described herein.

The household appliances such as an air conditioner and the security appliances such as an obstacle detecting sensor and an open/close sensor are initiated to operate. In Step S11, the communication apparatus 1 recognizes the situation in the house. For example, it is determined whether the resident is present or absent in the house. If he or she is absent, then in Step S12, the broad band ADSL network is switched to be unavailable. Later, a telephone call is made from the external communication device 14 such as a mobile phone via an analog telephone network to the communication apparatus 1 in the house, then in Step S13, the communication apparatus 1 verifies the telephone number of the calling telephone 14 (communication device). In Step S14, if it is approved, the broad band ADSL network between the communication apparatus 1 and the outside is switched to be available.

Also, in this instance, besides the resident's presence or absence, any other conditions for switching the ADSL network to be unavailable may be adapted including, for example, the time, the display status and/or the power ON/OFF of the communication apparatus, and the operations of the household and security appliances.

Embodiment 15

Figure 9:
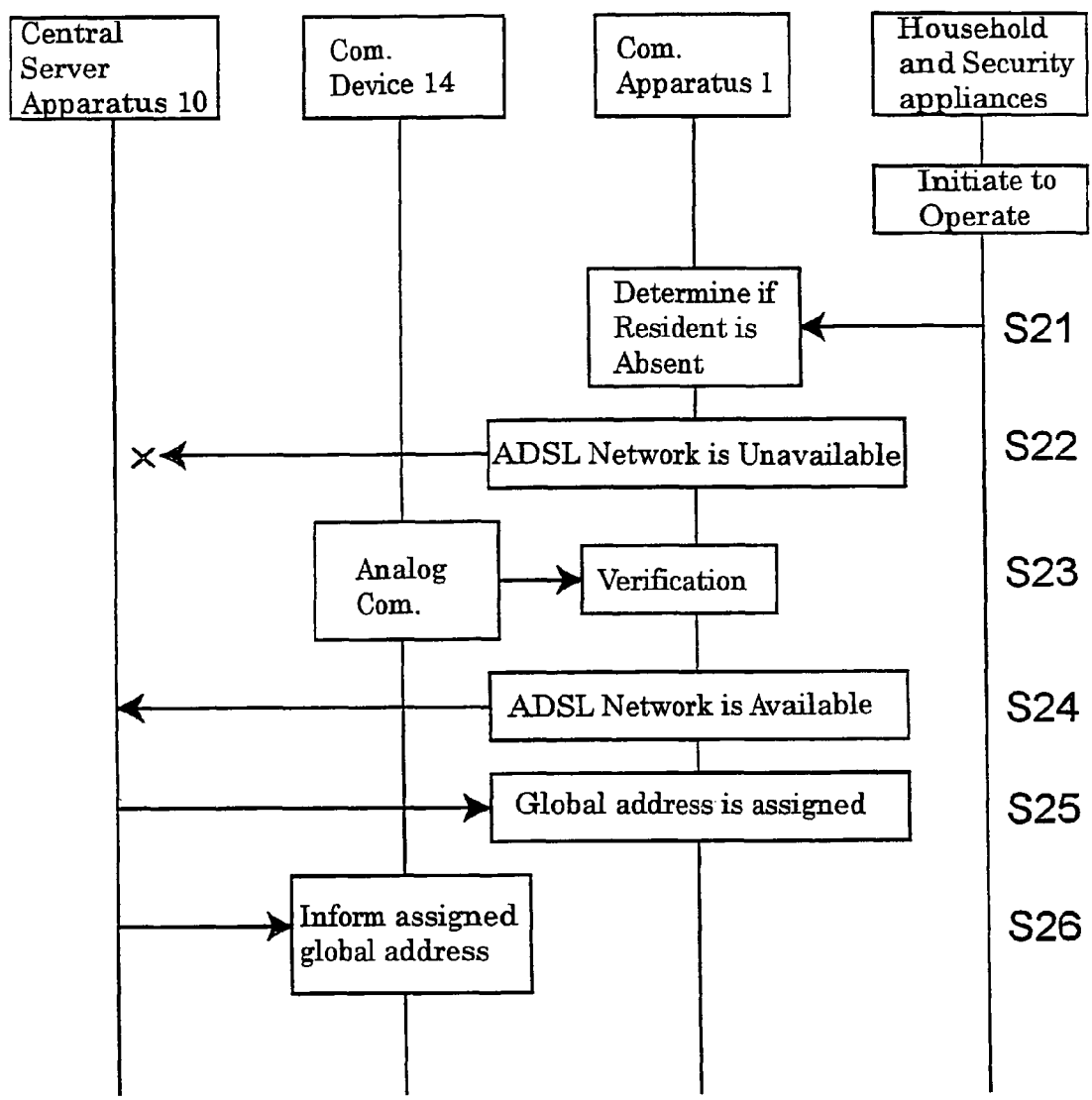
FIG. 9 is a flow chart illustrating a process according to the fifteenth embodiment of the present invention.

FIG. 9 is a flow chart illustrating a process of a system according to the fifteenth embodiment of the present invention. The flow chart of the embodiment will be described herein.

The household appliances such as an air conditioner and the security appliances such as an obstacle detecting sensor and an open/close sensor are initiated to operate. In Step S21, the communication apparatus 1 recognizes the situation in the house based upon the status and operation of the appliances. For example, it is determined whether the resident is present or absent in the house. If it is determined that he or she is absent, then in Step S22, the broad band ADSL network is switched to be unavailable. Later, a telephone call is made from the external communication device 14 such as a mobile phone via an analog telephone network to the communication apparatus 1 in the house, then in Step S23, the communication apparatus 1 verifies the telephone number of the calling telephone 14 (communication device). In Step S24, if it is admitted, the broad band ADSL network between the communication apparatus 1 and the outside is switched to be available. When the broad band ADSL network is available, in Step S25, the central server apparatus 10 assigns a global address to the communication apparatus 1. In Step S26, the assigned global address is informed to a communication device 14 having a predetermined telephone number and an e-mail addressee having a predetermined e-mail address. Those predetermined telephone number and e-mail address are stored in a predetermined memory region of the communication apparatus 1.

In the above-mentioned flow chart, besides the resident's presence or absence, any other criteria for switching the ADSL network to be unavailable may be adapted including, for example, the time, the display status and/or the power ON/OFF of the communication apparatus, and the operations of the household and security appliances.

According to the system of the embodiment so constructed, only particular persons can access the communication apparatus under particular conditions while preventing the improper access thereto so that the highly reliable communication process can be realized. Also, since the broad band ADSL network is available for communication only when so required, a stability of data security and an advantage of the broad band ADSL network can be achieved. Further, after the availability of the broad band ADSL network is established, the communication apparatus 1 informs the central server apparatus 10 and the predetermined telephone and/or e-mail addressee of the ADSL's availability, therefore, the security can be even further enhanced.

Embodiment 16

The communication system according to the sixteenth embodiment of the present invention will be described herein.

The communication system of the embodiment has the structure similar to that as illustrated in FIG. 5. Thus, the communication networks for the communication apparatus 1 include a telephone network 20 and an Internet network 30 as the data communication network.

In the communication system, while the resident stays in the house, he or she uses the communication apparatus 1 to select the "present" setting (mode) or release the "absent" setting. Then, the communication apparatus 1 can be used to remotely control the appliances, for example, to drive the washing machine 15 in the house, and to receive a finishing message from the washing machine 15. Also, the communication apparatus 1 can control the security appliances. For example, the open/close sensor 18 provided at the entrance can be activated, and the obstacle detecting sensor 17 provided at the windows facing the garden can be deactivated by the communication apparatus 1.

While the resident stays in the house, in general, it should not be necessary to drive the household appliances and to operate the open/close sensor 18 from the outside. Therefore, when the resident is present, the access via the external network 12 from the outside may be disrupted with a message, for example, to drive the air conditioner 16 or the washing machine 15 and to deactivate the operating open/close sensor 18.

The disruption of the access via the external network 12 may involve the disconnection of either one of the telephone network 20 and the Internet network 30 as the data communication network, or the disconnection of all of them.

Also, all of access from the outside is not necessary disrupted. The access to confirm the operation status indicating whether the household and security appliances are properly working may be admitted, but on the other hand, the access to control the deactivated appliances to be activated may be disrupted. Thus, it is possible to limit the scope of the access depending upon the message or content. To this result, when the resident is in the house but away from the communication apparatus 1, he or she can learn from the communication device 14 such as the mobile phone, for example, whether the operation of the washing machine is finished. Therefore, the advantage of the network system for remote control can fully be enjoyed.

The limitation of the access may also involve the limitation for either one of the telephone network 20 and the Internet network 30 as the data communication network, or the limitation for all of them. In view of prevention of the illegal access, the access from the outside via the Internet network 30 as the data communication network (with high speed transmission technique) may be more strictly limited. This is also true for the disruption or limitation of the access described below.

Another type of the access limitation can be conceived. In this instance, each telephone number of the mobile phones 14 for each family member is stored in the communication apparatus 1 so that the access from the registered (pre-stored) of the communication devices 14 may be admitted and the access from the other unregistered communication devices are disrupted.

A person skilled in the art can conceive various configurations to realize those limited access. For example, a security function of a router that composes the network connecting means 2 can be used to disrupt the messages from the unregistered communication devices which are not pre-stored, and the messages containing the prohibited protocols. Also, the message containing the unregistered identification and/or the keyword may be rejected by the communication apparatus 1.

In the foregoing description, the situation is divided into the "present" and "absent" settings (modes) for the resident's existence in the house. However, another type of situation can be used, i.e., a "semi-present" situation can be set, where only children and elder persons stay in the house. In this instance, the communication apparatus 1 is designed such that the access to particular terminal appliances dealing with water and heat may be admitted only from the registered communication devices 14 and disrupted from the communication apparatus 1 in the house.

As above, it is so described that the resident sets the "present" or "absent" setting, for example, by pushing the button of the communication apparatus 1. Also, the resident may preset the schedule for the "present" and "absent" settings in the communication apparatus 1 in accordance with the time, the day of week, and so on, so that the communication apparatus 1 may automatically switch the situation. In this instance, if the resident programs the night time as being the "present" setting, the communication apparatus 1 automatically sets the "present" setting, even where the resident forgets to change the setting when returning to the house. Eventually, the access from the external network 12 can be disrupted or limited in the night time. Also, if the resident programs the holidays as being the "present" setting, the access from the external network 12 can be disrupted or limited.

Alternatively, the communication system having even higher level of security is designed so as to allow an automatic switching only from the "absent" setting to the "present" setting. While the resident programs the day time of the week days as being the "absent" setting because working outside, and he or she may have a day off to stay in the house in the day time of the week day, then if he or she forgot to release the "absent" setting, the communication apparatus 1 could unintentionally be accessed from the outside. According to the communication system, such unintentional access from the outside can advantageously be prevented.

In order to realize the automatic switching from the "absent" setting to the "present" setting, the communication apparatus 1 is configured such that it determines the resident's presence in the house if it detects the manual operation by the resident for controlling the air conditioner 16, the washing machine 15, and the luminary appliance (not shown) or if the obstacle sensor 17 thereof detects the person more than a predetermined frequency in a predetermined time period.

Embodiment 17

The communication system according to the seventeenth embodiment of the present invention will be described herein.

The communication system of the embodiment has the structure similar to that as illustrated in FIG. 6. Thus, the communication networks for the communication apparatus 1 include a telephone network 20 and an Internet network 30 as the data communication network.

The disruption of the access, the limitation of the access, the switching or changing of the settings may be done for either one of the telephone network 20 and the Internet network 30 as the data communication network, or for all of them. In view of prevention of the illegal access, the access from the outside via the Internet network 30 as the data communication network (with high speed transmission technique) may be more strictly limited.

Referring back to FIG. 6, the second unregistered communication device 42 corresponds to a personal computer at office or a mobile phone for another family member.

Figure 10:
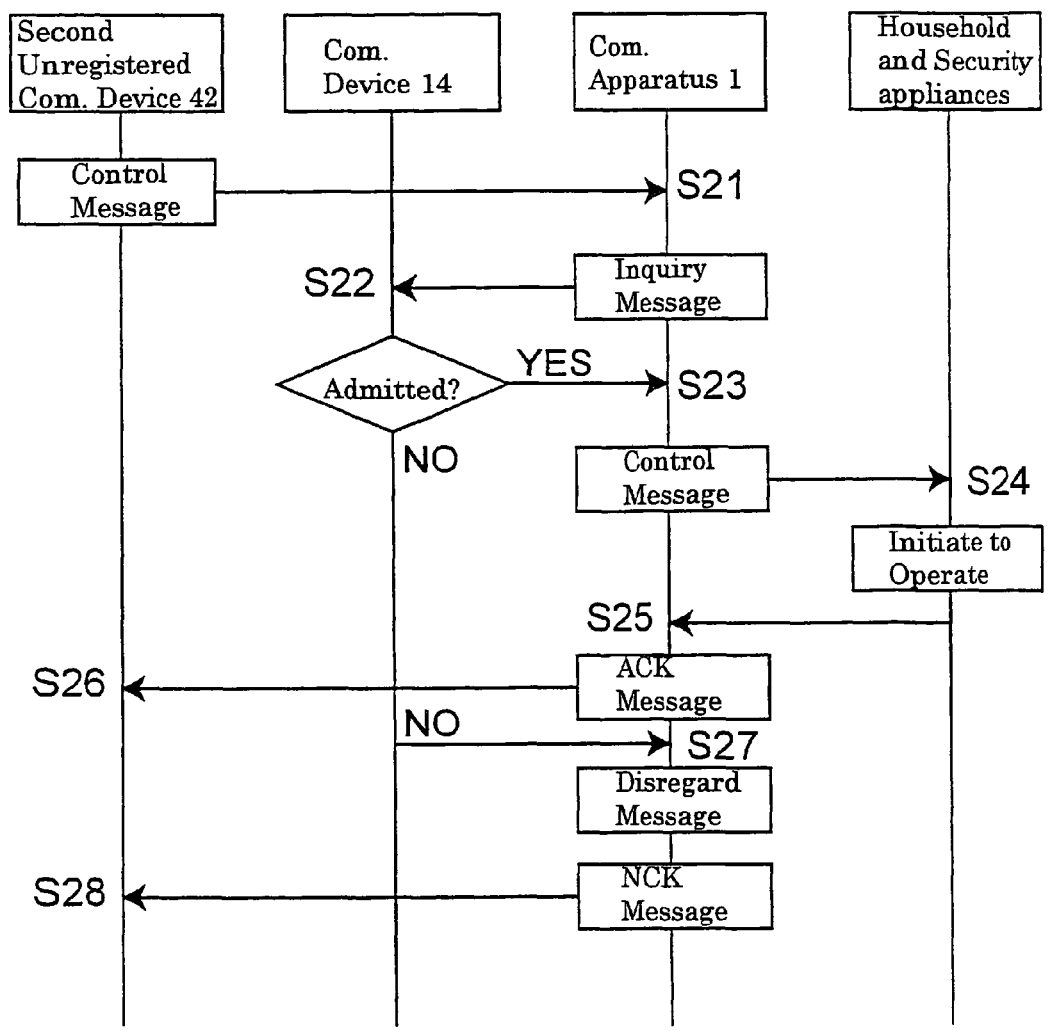
FIG. 10 is a flow chart illustrating a process according to the sixteenth embodiment of the present invention.
Figure 11:
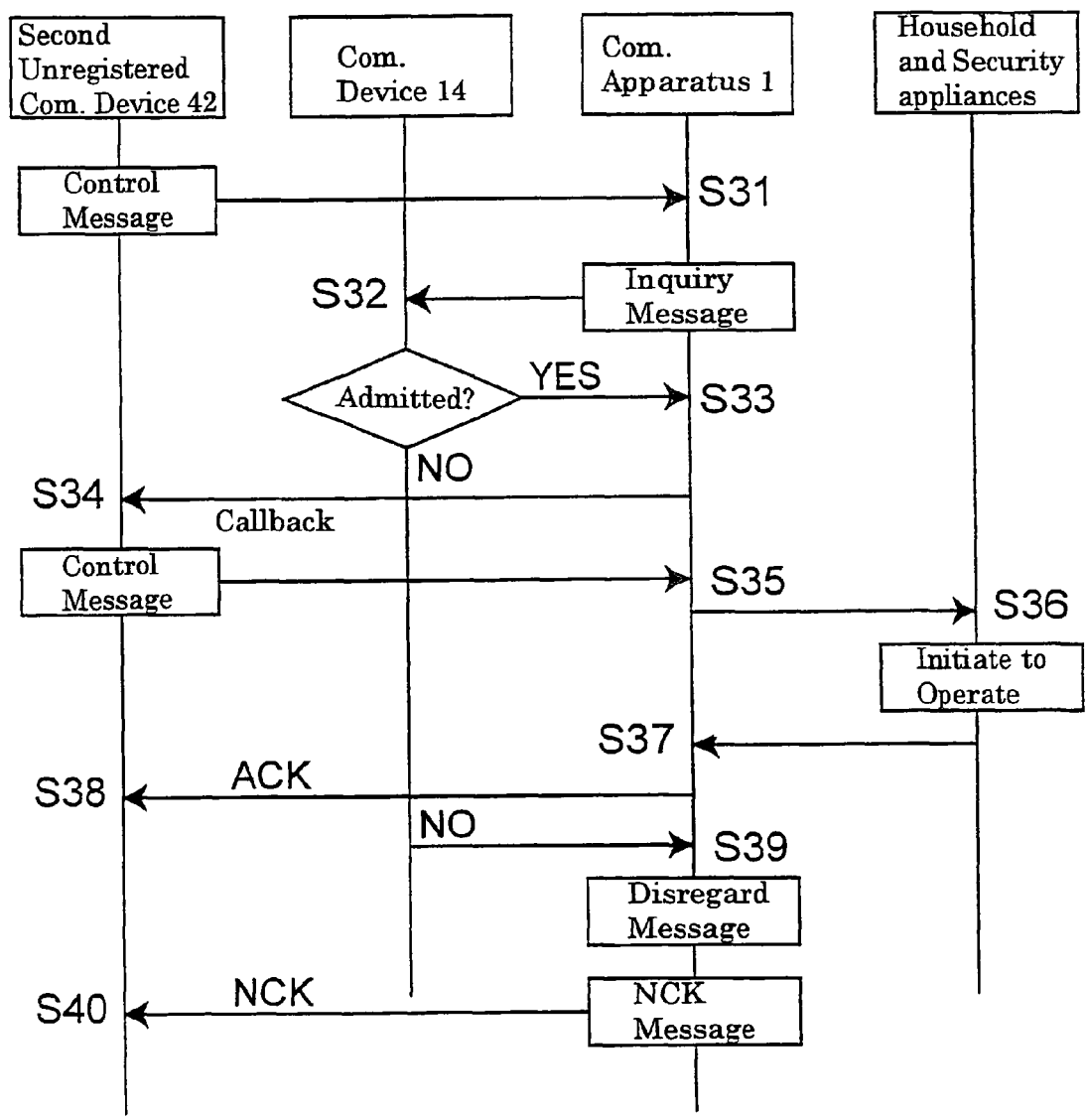
FIG. 11 is a flow chart illustrating a process according to the seventeenth embodiment of the present invention.

With reference to FIGS. 10, and 11, described herein is the process for allowing the access to the household and security appliances in the house from the second unregistered communication device 42 such as mobile phone for another family member.

FIG. 10 illustrates an exemplary process for obtaining approval or rejection from the registered communication device 14 whether the access from the second unregistered communication device 42 is admitted. In Step S21, if an access message is transmitted from the second unregistered communication device 42 to the communication apparatus 1, then in Step S22, an inquiry message is transmitted from the communication apparatus 1 to the registered communication device 14, inquiring whether the access from the second unregistered communication device 42 is to, be admitted or not. In Step S23, if an approval message is returned from the registered communication device 14, and in Step S24, the communication apparatus 1 transmits the access message to the household and security appliances for control and operation thereof, and in Step S25, a result message is returned to the communication apparatus 1. Then in Step S26, upon receiving the result message, an acknowledgement, (ACK) message is returned to the second unregistered communication device 42. On the other hand, for the inquiry message, in Step S27, if a rejection message is returned from the registered communication device 14, then in Step S28, the communication apparatus 1 disregards the access message and returns a non-acknowledgement (NCK) message to the second unregistered communication device 42, indicating that the access message is rejected.

Next, FIG. 11 is a flow chart illustrating another process having a callback step. Similar to FIG, 10, in Step S33, if the inquiry message is admitted, then in Step S34, the communication apparatus 1 make a call back to the second unregistered communication device 42. A calling-number announcing program can be used to obtain the telephone number of the second unregistered communication device 42 for the callback. The unregistered communication device 42 maintains the connection so that in Step S35 to S37, it controls the household and security appliances in the house through the communication apparatus 1, in Step S38, receives the acknowledgement (ACK) message confirming that operation is done, and cuts the connection. On the other hand, for the inquiry message, in Step S39, if the rejection message is returned from the registered communication device 14, then in Step S40, the communication apparatus 1 disregards the access message and returns a non-acknowledgement (NCK) message to the second unregistered communication device 42, indicating that the access message is rejected.

It should be noted that the processes for the mutual communication are not limited to ones illustrated in FIGS. 10 and 11. For example, any identifications and passwords may be used for admitting the access from the unregistered communication device. Also, the communication system may be configured such that the scope of the access message can be modified. That is, the communication system may be configured such that the communication apparatus 1 temporarily admits the access message from the second unregistered communication device 42, which is not only to confirm the status and operation of the terminal appliances but also substantially control the appliances. Also, the communication system may be configured such that, between the callback and disconnection of the second unregistered communication device 42 in the flow chart shown in FIG. 11, the communication apparatus 1 temporarily admits any types of access messages from the second unregistered communication device 42 to the communication apparatus 1 and as well as the terminal appliances.

Besides the communication processes shown in FIGS. 10 and 11, the communication apparatus 1 may be designed such that it memorized the telephone number of the second unregistered communication device 42 thereby to recognize a new registered communication device 14.

In the context of the specification and FIG. 6, while the first unregistered communication device 41 cannot be modified to the communication device capable of communicating with the communication apparatus 1, the second unregistered communication device 42, e.g., the personal computer at office and a mobile phone for a family member, may be modified by taking necessary steps thereby to admit the access to the communication apparatus 1. Therefore, the meanings of the term "unregistered" in the first and second unregistered communication device 41, 42 are different.

In the foregoing embodiments, the network connecting means 2 and the communication apparatus 1 are separate components, they may be incorporated within a single housing. Also, the communication apparatus 1 is used to preset and store the schedule therein, another apparatus such as a portable data terminal may store the schedule and the communication apparatus 1 refers the schedule stored in the portable data terminal. Thus, the portable data terminal may administrate and transmit the schedule to the communication apparatus 1. Also, a server apparatus and/or an e-mail server apparatus may be used instead of the portable data terminal.

In the forgoing embodiments, the ADSL network is used as the broad band Internet network, it is not limited thereto. The present invention relates a communication configuration providing service for telephone subscribers and another communication configuration allowing a continuous connection with the high speed digital transmission technique, which is different from the analog communication network.

The invention claimed is:

1. A communication apparatus used in a house, comprising:
    a data processor connected with at least one terminal appliance in the house; and
    first and second transceivers connected with the data processor being capable of connecting to a high-speed digital network and a high-security telephone network, respectively, the high-speed digital network being one of an ADSL network, a fiber optical network, and a cable network,
    wherein the data processor is operable to recognize whether a resident stays in the house and is operable to disconnect communication via the high-speed digital network and uses only the high-security telephone network for communication, upon recognizing an absence of the resident from the house, and
    wherein the data processor is operable to recognize whether the resident stays in the house by using at least one of an obstacle detecting sensor and a luminary appliance.

2. A communication apparatus used in a house, comprising:
    a data processor connected with at least one terminal appliance in the house;
    first and second transceivers connected with the data processor being capable of connecting to a high-speed digital network and a high-security telephone network, respectively, the high-speed digital network being one of an ADSL network, a fiber optical network, and a cable network; and
    a display connected to the data processor,
    wherein the data processor is operable to recognize whether a resident stays in the house and is operable to disconnect communication via the high-speed digital network and uses only the high-security telephone network for communication, upon recognizing an absence of the resident from the house, and
    wherein the data processor is operable to recognize the absence of the resident from the house when the display is switched off.

3. A communication apparatus used in a house, comprising:
    a data processor connected with at least one terminal appliance in the house; and
    first and second transceivers connected with the data processor being capable of connecting to a high-speed digital network and a high-security telephone network, respectively, the high-speed digital network being one of an ADSL network, a fiber optical network, and a cable network,
    wherein the data processor is operable to recognize whether a resident stays in the house and is operable to disconnect communication via the high-speed digital network and uses only the high-security telephone network for communication, upon recognizing an absence of the resident from the house, and
    wherein the communication apparatus is operable to function as an answering machine and the data processor is operable to recognize the absence of the resident from the house when the answering machine is set on standby.

* * * * *